United States Patent [19]
Brueggemann et al.

[11] Patent Number: 5,894,121
[45] Date of Patent: Apr. 13, 1999

[54] READING APPARATUS FOR CHIP CARDS HAVING REDUCED CONTACT FRICTION

[75] Inventors: Ulrich Brueggemann, Heustreu; Klaus Schmoeger; Gerhard Hochgesang, both of Bad Neustadt, all of Germany

[73] Assignee: Preh-Werke GmbH & Co. KG, Bad Neustadt, Germany

[21] Appl. No.: 08/675,823

[22] Filed: Jul. 5, 1996

[30] Foreign Application Priority Data

Jul. 5, 1995 [DE] Germany ............... 19524536

[51] Int. Cl.$^6$ .................................................. G06K 7/06
[52] U.S. Cl. ........................... 235/441; 235/380; 235/492
[58] Field of Search ............................. 235/475, 479, 235/492, 380, 441

[56] References Cited

U.S. PATENT DOCUMENTS

| | | | |
|---|---|---|---|
| 4,735,578 | 4/1988 | Reichart et al. | 439/152 |
| 4,904,852 | 2/1990 | Mita et al. | 235/479 |
| 4,931,991 | 6/1990 | Cvijanovich | 235/492 X |
| 4,976,630 | 12/1990 | Schuder et al. | 439/260 |
| 4,990,758 | 2/1991 | Shibano et al. | 235/479 X |
| 5,036,184 | 7/1991 | Sasaki | 235/475 X |
| 5,196,687 | 3/1993 | Sugino et al. | 235/479 X |
| 5,202,551 | 4/1993 | Parrer et al. | 235/479 X |
| 5,463,210 | 10/1995 | Imura | 235/492 X |
| 5,564,933 | 10/1996 | Bouchan et al. | 235/492 X |

FOREIGN PATENT DOCUMENTS

| | | |
|---|---|---|
| 38 159 59 C2 | 9/1990 | Germany. |
| 85 29 580 U | 2/1996 | Germany. |

OTHER PUBLICATIONS

DE 40 30 196 A1, Offenlegungsschrift, Germany, Mar. 19, 1992 date of publication.

Primary Examiner—Donald Hajec
Assistant Examiner—Karl Frech
Attorney, Agent, or Firm—Griffin, Butler, Whisenhunt & Szipl, LLP

[57] ABSTRACT

By applying pressure created by a forced guidance of a sled (11) to contact springs (12–19) carried by the sled, a reduced contact friction upon insertion, as well as upon removal, of a chip card (3) results. This forced guidance is achieved by having a cut-out (7) in a circuit board (5) in which the sled is shoved by the inserted card to be guided by double slot guides (9) on each side of the sled.

11 Claims, 2 Drawing Sheets

READING APPARATUS FOR CHIP CARDS HAVING REDUCED CONTACT FRICTION

BACKGROUND OF THE INVENTION

This invention relates to reading apparatus for chip cards (such as telephone cards, patient cards money cards) of a type having a housing with a receiving slot or pocket, for receiving an inserted chip card therein, there being mounted in the receiving pocket a slidable sled for opposing the chip card with a spring force (the slide's movement being limited by a stop) and contact springs and a circuit board.

A known reader with contact apparatus is disclosed in German Gebrauchsmuster DE-GM 85 29 580. In this case, contact noses on contact spring clips extend through openings in a wall of a receiving pocket for a chip card (plastic card having an electronic chip therein, sometimes referred to as a logic or smart card). An electrical coupling with the chip card takes place within the device via these outwardly extending contact noses. The ends of the contact springs at the device are in fixed contact with analyzing electronics. The ends of the contact springs at the chip card, springingly and releasably, contact surfaces of the chip card. U.S. Pat. No. 4,735,578 to Reichart et al. and U.S. Pat. No. 4,976,630 to Schuder et al. disclose readers having as contact apparatus movable contact springs and slits. Also in these cases, contact noses on contact springs stick out of the slits. Between the ends of the contact springs at the devices and analyzing electronics there are flexible lead couplings, for example, conductive foil or flat cable. These flexible lead connections have the disadvantage that because of work environments and mechanical requirements, they can be ripped or broken. Further, using this structure causes friction damage to the contact surfaces of the chip cards, which can lead to increased wear of these contact surfaces.

It is therefore an object of this invention to provide a reduced friction contacting for the chip card and to avoid use of flexible lead connections.

SUMMARY OF THE INVENTION

According to principles of this invention, a reading apparatus for chip cards of the type described in the opening paragraph above, includes an additional forced guiding mechanism for a sled which creates a friction-free contact between contact springs and terminal contacts of the chip card and a circuit board. As the chip card, and therefore the sled, are shoved toward a stop, the contact springs do not contact the terminal contacts of the chip card and the apparatus circuit board until the stop is reached. A contacting substantially before this point, during the shoving, is not possible. Upon removal of the chip card, because of the guiding mechanism of the sled, the contact springs are lifted from the terminal contacts immediately so that again, a friction-and-contact-free removal results.

BRIEF DESCRIPTION OF THE DRAWING

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
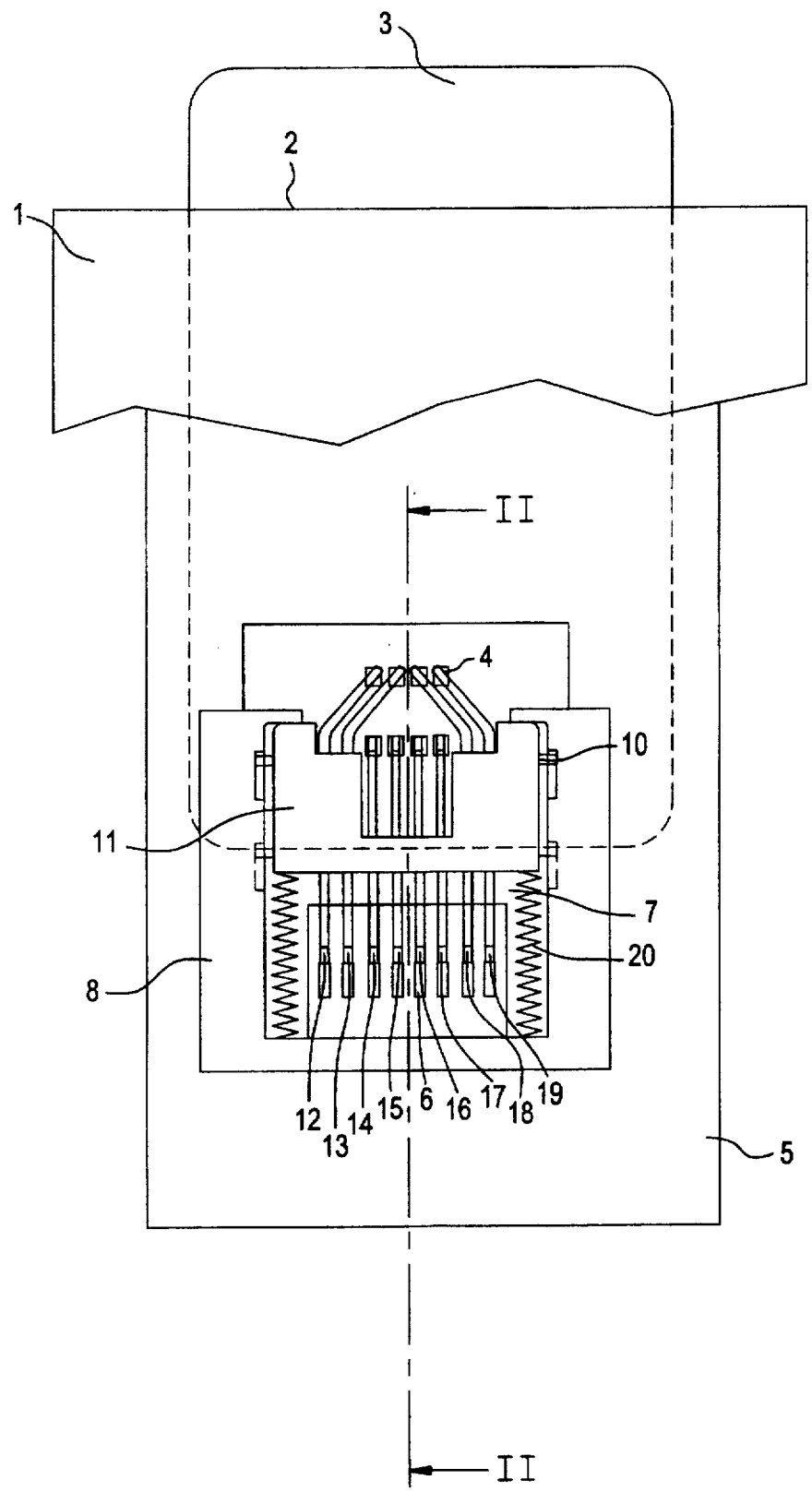
FIG. 1 is a plan view of a contact apparatus of this invention.

A housing 1 of a reading apparatus (which is not disclosed in detail) has an insertion pocket, or slot 2, with a small end opening for a chip card (logical card with an electronic element therein, sometimes called a smart card), there being two rows of eight terminal contact positions 4 arranged in a rectangular contact field on an upper surface of the chip card 3. A circuit board 5, having many circuit components thereon (which are not specifically described herein) is mounted in the housing 1. Eight terminal contacts 6 are arranged to the circuit board near one another. The circuit board 5 has a cut out area in the form of a slot 7 (see FIG. 1) a sled guide 8 is arranged on each side of the slot 7 to be fixed to the circuit board 5, to the right and left of a shoving direction of the chip card 3. Each of the sled guides 8 has a doubly arranged, substantially Z-shaped slot guide 9, (see FIG. 2). A sled 11 is mounted in the slot guides via guiding pins 10 in a manner described in more detail below to be forcefully guided thereby. Contact springs 12–19 are attached to the sled 11 to cooperate with the terminal contacts 4 of the chip card 3 and the terminal contacts 6 of the circuit board 5.

Depending upon a shape of the sled 11, an arrangement of the contact springs 12–19 can be realized whereby the free spring lengths at each end of the contact springs 12–19 are substantially the same, although their shapes may be different. This is necessary so that the same forces will be applied to the terminal contact positions 4 and the terminal contacts 6 and so that a uniform, as well as a complete, closing of the contacts results. The four middle contact springs 14–17 are straight and the respective opposite outer-most contact springs 12, 13, 18, 19 have bent shapes, preferably at an angle of 40° to the contact springs 14–17 (see FIG. 1). In this manner, signal flows take place between the circuit board 5 and the chip card 3, from the same side with the contact elements for the chip card 3 and components of the circuit board 5 being space economical. It is, in this regard, not important whether the contact springs 12–19 are attached, and arranged, below or above the sled 11. Both possibilities are possible.

When the return springs 20, preferably formed as compression springs, are compressed, they urge the sled 11 back toward ejection of the chip card 3 so that the contact springs 12–19 are lifted from the terminal contact positions 4 and the contact terminals 6. The chip card 3 is removed without further rubbing on the terminal contacts 4.

A controlled movement, as well as position orientation, of the sled 11 is carried out by the shape of the slot guides 9. The doubled-configuration of the slot guides 9 prevents an escape, binding, or the like of the sled 11.

Figure 2:
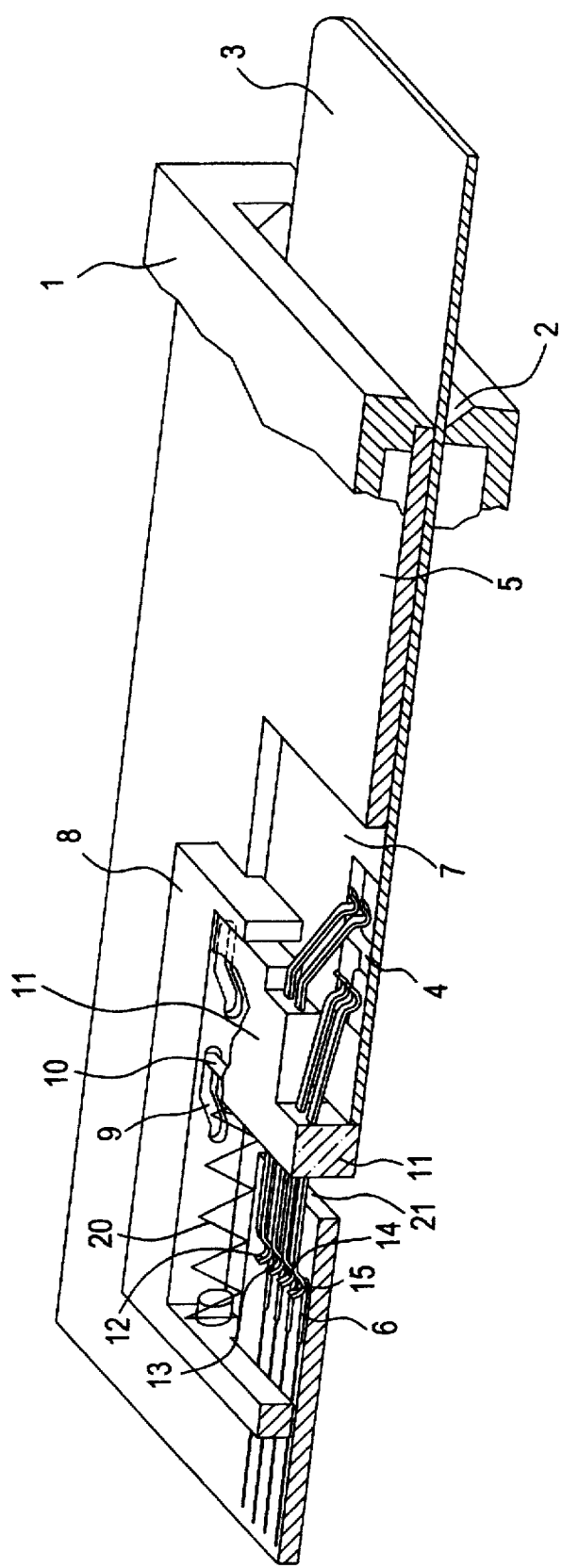
FIG. 2 is a perspective, fragmented, cross sectional view taken on line II—II in FIG. 1.

The return springs 20 are inlaid-integrated into the sled guides 8, (see FIG. 2).

In a resting position of the chip card 3 in the insertion pocket 2 of the housing 1, the sled 11, and thus the contact springs 12–19 (and their ends at the terminal contacts 4 of the chip card 3 and the terminal contacts 6 of the circuit 5) are held in a raised position, by operation of the return springs 20. The terminal contacts 6 of the circuit board and the terminal contact positions 4 of the chip card 3 are, thus, not touched by the contact springs 12–19 nor electrically coupled therewith.

When the chip card 3 is manipulated in the insertion pocket 2 toward a contacting direction, the sled 11 is guided in the slot guide 9, for a short time, parallel to the circuit board 5 but thereafter sunk, in a substantially lateral (perpendicular) direction, while its planar (horizontal) orientation is retained. This sinking causes the contact springs 12–19, for the first time (that is at the end of the shoving of the chip card 3), to seat against the terminal contact positions 4 and the corresponding terminal contacts 6 to electrically couple these together.

At this position, the sled 11 has reached an edge 21 of the circuit board slot 7, which serves as a stop for the sled 11 and thereby for the chip card 3.

By using this forced guiding of the sled in a cut-out area of the circuit board, a reduction of a structural profile of the contact elements, and thus the reader apparatus, is achieved. Additionally, elimination of flexible lead couplings and the integrated construction of the return springs at a rear portion of the sled guides also contributes to this. Because of the inventive arrangement of the contact springs on the sled, as well their outer end structures, the contact making with the chip card and the component arrangement on the corresponding end of the circuit board can be more space efficient. Thus, the circuit board, and thereby the contact area can be structurally smaller and the structural length of the reader apparatus can be reduced.

The invention claimed is:

1. Reading apparatus for chip cards with terminal contacts thereon having: a housing with a receiving pocket for receiving chip cards inserted therein; a sled slidably mounted in the receiving pocket for being contacted by the chip cards and slid, against a spring bias, the sled's movement being limited by a stop; contact springs; and a circuit board with terminal contacts thereon;

wherein, the contact springs are directly attached to the sled and wherein is further included a sled guiding means for forcefully guiding the sled in a direction substantially lateral to its sliding movement so that an electrical connection is made to each of the terminal contacts of a chip card inserted into the receiving pocket in an insertion motion and the terminal contacts of the circuit board by the contact springs only near an end of the insertion motion of the chip card, and so that these electrical connections are immediately broken upon beginning a removal of the chip card from the insertion pocket.

2. Reading apparatus for chip cards as in claim 1 wherein the guiding means is formed of slot guides positioned on respective opposite sides of the sled in which pins attached to the sled are guided.

3. Reading apparatus for chip cards as in claim 2 wherein the slot guides are formed of substantially Z-shaped slots.

4. Reading apparatus for chip cards as in claim 3 wherein the Z-shaped slots of the slot guides are each arranged to be double.

5. Reading apparatus for chip cards as in claim 1 wherein the sliding movement of the sled takes place within a cut-out area of the circuit board.

6. Reading Apparatus for chip cards as in claim 5 wherein an edge of the cut-out of the circuit board serves as a stop for the sliding movement of the sled.

7. Reading apparatus as in claim 5 wherein the contact springs of the circuit board which extend at least partially into the cut-out area of the circuit board are only arranged at one end of the circuit board.

8. Reading apparatus as in claim 1 wherein the sled engages at least one compression spring which is inset integrated into the sled.

9. Reading apparatus for chip cards as in claim 1 wherein the contact springs are arranged such that respective opposite ends thereof lie against the terminal contacts of the chip card inserted into the receiving pocket and the terminal contacts of the circuit board for making contact therewith when the sled is slid against the stop.

10. Reading apparatus for chip cards as in claim 1 wherein the contact springs include at least one straight contact spring and a contact spring which is bent relative to the straight contact spring.

11. Reading apparatus as in claim 10 wherein the spring lengths of the straight and bent contact springs are substantially the same.

* * * * *